United States Patent [19]

Turner, deceased et al.

[11] 4,050,122

[45] Sept. 27, 1977

[54] SIDE-MOUNTED AUTOMATIC POWER RELEASE ATTACHMENT FOR MANUAL CONNECTORS

[75] Inventors: James Wesley Turner, deceased, late of El Centro, Calif., by Thomas M. Heim, executor; Ray E. Spinks, El Centro, Calif.

[73] Assignee: The United States of America as represented by the Secretary of the Navy, Washington, D.C.

[21] Appl. No.: 607,316

[22] Filed: Aug. 25, 1975

[51] Int. Cl.² ........................................... B64D 17/32
[52] U.S. Cl. ........................... 24/230 A; 244/151 A; 294/83 A; 294/83 AE
[58] Field of Search ........... 244/151 R, 151 A, 151 B, 244/137 R; 294/83 A, 83 AE, 83 R; 74/128, 527, 104; 24/230 AV, 230 AT, 230 A, 230 AM, 230 AP, 230 LP, 230 R, 201 LP, 73 PH

[56] References Cited

U.S. PATENT DOCUMENTS

| | | | |
|---|---|---|---|
| 2,269,835 | 1/1942 | Wallace et al. | 74/128 |
| 3,183,568 | 5/1965 | Gaylord | 24/230 A |
| 3,298,286 | 1/1967 | Tyler | 74/104 |
| 3,624,674 | 11/1971 | Gaylord | 24/230 AV |
| 3,658,281 | 4/1972 | Gaylord | 244/151 A |
| 3,737,126 | 6/1973 | Martin | 244/151 B |
| 3,744,103 | 7/1973 | Gaylord | 244/151 A |

*Primary Examiner*—George E. A. Halvosa
*Assistant Examiner*—Galen Barefoot
*Attorney, Agent, or Firm*—R. S. Sciascia; G. J. Rubens

[57] ABSTRACT

An attachment for a manually operable quick-release connector to enable the connector to be retrofitted so as to be power operated by a remote signal, the attachment being mounted to the side of the connector in a position offering a low profile, a minimum discomfort to the user, and requiring a minimum modification of an existing connector structure during retrofitting.

8 Claims, 3 Drawing Figures

SIDE-MOUNTED AUTOMATIC POWER RELEASE ATTACHMENT FOR MANUAL CONNECTORS

CROSS REFERENCE TO RELATED APPLICATION

This invention is an improvement over our invention described in U.S. patent application Ser. No. 512,823 filed OCT. 4, 1974 for "Automatic Power Adapter for Manual Quick-Release Connectors", now U.S. Pat. No. 3,922,762.

BACKGROUND OF THE INVENTION

This invention relates to release mechanisms, and more particularly to a power attachment capable of being mounted to the side of an existing parachute release connector, as well as being incorporated in an original construction, to enable the pilot to be separated from the parachute automatically in response to an initiating signal.

In our above mentioned patent application, the need was described for a device that would enable a parachutist, who was injured or otherwise unable to manually operate the connector for any reason, to be released from his parachute automatically, such as by his entry into a body of water.

Our prior power adapter straddled the middle of the female connector half, and through a cam acting on either the center of a vertical sliding bar, or a rotating shaft (as is utilized in U.S. Pat. No. 3,183,568), operated the respective locking member under power conditions to release the connector.

Although the prior adapter operates in a satisfactory manner, its central location on the female fitting requires more extensive and expensive retrofitting construction than is believed necessary, and further, the electrical conductors extending centrally to the power adapter is in an interfering location on the female connector half. In addition the location of the power adapter inherently projects outwardly adding to the overall thickness of the connector.

The power adapter of the present invention when used on a connector using a rotatable shaft type of locking member is located on the side of the female connector half which is a less obtrusive position than the prior adapter construction, and which requires a minimum of retrofitting construction.

SUMMARY OF THE INVENTION

An improved power attachment is adapted to be mounted to a conventional, manually operated quick-release connector in a manner that requires a minimum amount of retrofitting construction and at a minimum cost. Although the attachment is particularly designed as an adapter for retrofitting existing manual connectors, there is no reason why the invention cannot be incorporated in an original construction.

The power attachment of this invention is particularly suited for incorporation into, or modification of a quick-release connector of the type having a rotatable locking shaft extending transversely the female fitting, and which is accessible at an opening in one side thereof, such as the type represented by U.S. Pat. No. 3,183,568.

The power attachment comprises an elongate housing adapted to be bolted to the side of the female fitting adjacent the side opening so as to be contiguous with and accessible to the rotatable shaft. The housing contains transverse opening aligned with the rotatable shaft in the female fitting in which opening is positioned a rotatable transition disk having interconnecting means with an extension of the rotatable shaft. The housing also contains a longitudinally extending cylinder having a piston movable by a suitable power source in a direction normal to the rotatable shaft and adapted to engage and rotate the shaft through the transition disk. Interlock means are provided to secure the rotatable shaft in an unlocked position after it has been operated by a self contained power source to prevent inadvertent reuse with an expended power source.

STATEMENT OF THE OBJECTS OF THE INVENTION

A principle object of this invention is to provide a quick-release connector with a power means to assist the user to release the connector halves in an emergency situation.

Another important purpose of this invention is to provide such power means in the form of an adapter for retrofitting existing manually-operable connectors simply and inexpensively.

Still another object is to construct such power means for attachment to the side of the connector to provide a low profile configuration offering the minimum obstruction on the parachute harness to the user.

Other objects, advantages and novel features of the invention will become apparent from the following detailed description of the invention when considered in conjunction with the accompanying drawings.

DESCRIPTION OF THE PREFERRED EMBODIMENT

Figure 1:
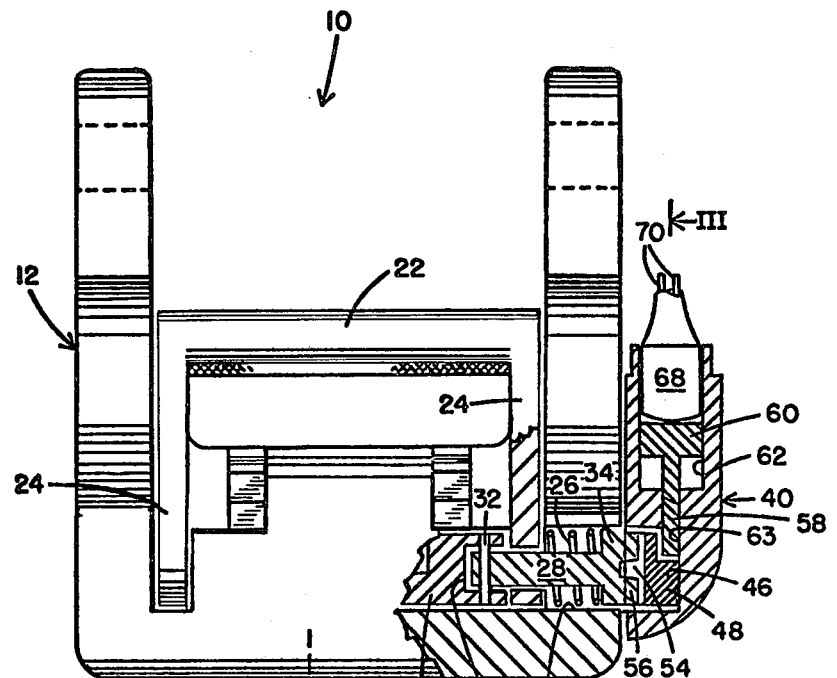
FIG. 1 is a plan view of a conventional manually operable quick-release connector partially cutaway to show the connection between the rotatable locking shaft and the power attachment of this invention.
Figure 3:
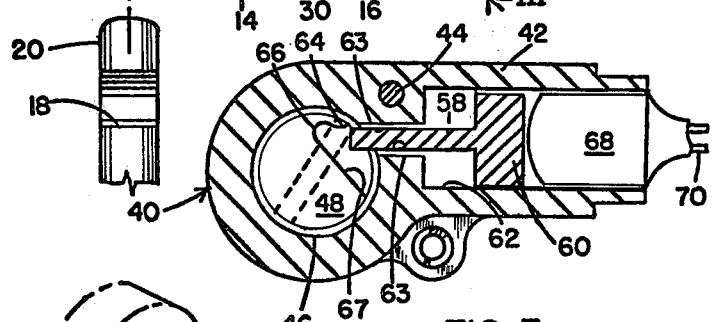
FIG. 3 is a cross-section taken along lne III of FIG. 1 of the novel power attachment showing the securing means for locking the rotatable shaft of the connector in an unlocked position.
Figure 2:
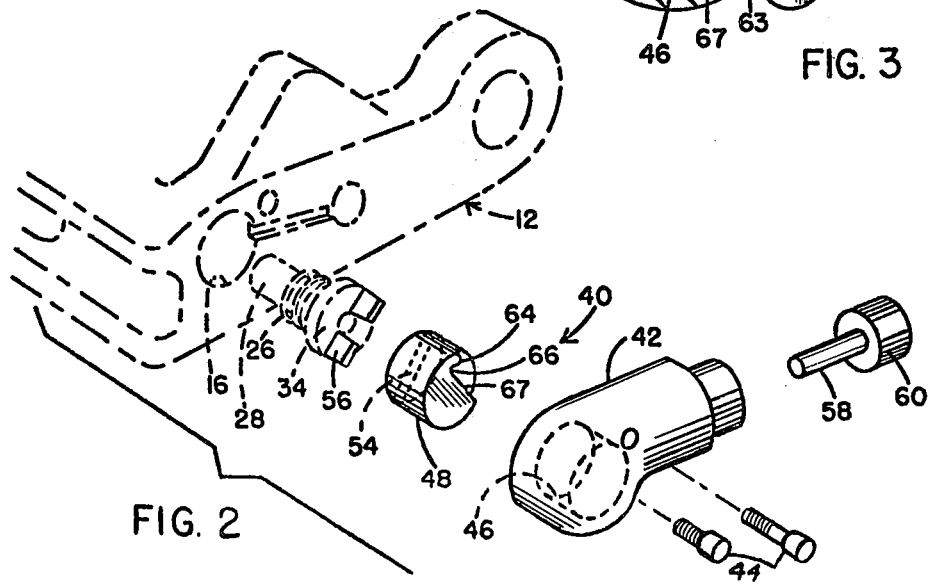
FIG. 2 is an exploded view of the novel power attachment shown in solid lines, the interconnecting connector parts being shown in phantom lines.

Referring to the drawings where like reference numerals refer to similar parts throughout the figures, there is shown in FIG. 1 a plan view of a quick-release connector 10 suitable for use in parachute harnesses. This connector is of the type shown in U.S. Pat. Nos. 3,183,568 and 3,624,674 issued to one J. A. Gaylord. FIG. 1 illustrates a female fitting half 12 of the connector, the male fitting half not being directly involved in this invention is not illustrated in the drawing; except for an end protion of one of the male prongs.

As is described in the above referenced patents, female fitting 12 contains a locking shaft 14 rotatably mounted in a transverse drilled opening 16 adjacent the forward edge of the fitting. Rotatable shaft 14 is designed to releasably engage a recess 18 in a male prong 20 of the male fitting. Shaft 14 is manually unlocked by a yoke finger lever 22 having a pair of side arms 24 suitably keyed to each end of the shaft. Lever 22, and shaft 14, are biased to a normally locked position by a pair of coil spring 26. Each spring 26 is anchored around a respective stub shaft 28 seated in the recessed end 30 of the outer end of shaft 14 and secured thereto by pin 32 to be rotatable therewith. Each stub shaft 28 has an enlarged head portion 34 which fits in opening 16 and lies substantially flush with the respective side of the female fitting.

The novel power release attachment 40 of this invention can be readily retrofitted to an existing connector as above-described with a minimum structural modification and cost, or incorporated into the assembly of any new construction.

Power attachment 40 comprises a housing 42 which is secured by bolts 44 compactly to a side of the female fitting frame without affecting the low profile of the female fitting. Housing 42 is formed with transverse opening 46 adapted to be axially aligned with fitting opening 16, as well as stub shaft 28 and rotatable shaft 14, when the attachment is secured to the female fitting.

Rotatably mounted in housing opening 46 is a disk-shaped member 48 which functions as an interface driving means between the power attachment and the rotatable shaft in a manner to be described. The outer face of disk 48 and the outer face of stub shaft head 34 are provided with interconnecting means, such as a recess 54 and lugs 56, respectively, whereby rotation of disk 48 will in turn rotate both stub shaft 28 and rotatable shaft 14 to release the male fitting.

Disk 48 is rotatably driven by a piston rod extension 58 of a piston 60 which slidably mounted in a cylinder 62 extending normal to disk 48. The free end of piston rod 58 is slidably supported in a drilled opening 63 in the housing. The inner face of disk 48 is provided with an off-center cam surface 64 aligned with piston rod 58 in its initial or starting position. Extending from cam surface, is a socket 66 having a flat side wall 67 which provides a locking means for a purpose as will presently be described.

Mounted in cylinder 62 on the opposite side of piston rod 58, is a self-contained pyrotechnic charge 68 having electrical leads 70 extending from a water switch (not shown) or any other electrical initiating device.

The operation of the power attachment is commenced by ignition of pyrotechnic charge 68 in any prescribed manner, such as a water activated switch when the parachutist enters a body of water over which he has ditched. Gas generated by charge 68 forces piston 60 and rod 58 into housing opening 46 rotating disk 48 by engaging offset cam 64. As disk 48 is connected to the rotatable shaft 14 through its interfacing slot 54 and stub shaft lugs 56, its rotation in turn rotates shaft 14, through a sufficient arc as determined by the design of cam 64, to release male prongs 20.

In the power actuated position, the end of piston rod 58 has advanced to seat into socket 66, at which position side wall 67 of the slot bears against the intermediate longitudinal surface of the rod. By this means, rotatable shaft 14 is locked in an opening position preventing the connector to be reconnected until the expended power attachment is replaced with a new power attachment. This is an important safety feature of the invention that is applicable whether the fluid charge is a self-contained pyrotechnic charge or is derived from a central source. In any event, whether the power release attachment is activated accidentially or during an actual emergency situation, it is a critical criteria that the connector be rendered inoperable until reset Such resetting in the case of a self-contained power source, as is preferrably used in the present invention, is accomplished by replacing the spent attachment with a new power release attachment 40. For this reason, as well as others, it is desirable that this replacement operation be performed in a simple and expeditious manner.

Similarly, the invention attachment enables a release connector that is limited to manual operation to be retrofitted to be power operable, in a manner that is also simple and expeditious, and at a nominal cost.

Obviously many modifications and variations of the present invention are possible in the light of the above teachings. It is therefore to be understood that within the scope of the appended claims the invention may be practiced otherwise than as specifically described.

What is claimed is:

1. A side-mounted release adapter for a conventional, manually operable, quick-release connector having interconnectible male and female fittings, and a rotatable shaft mounted in said female fitting and extending transverse to a prong on said male fitting for releasably locking said fittings together, said female fittings having a side opening through which an end of said rotatable shaft is accessible; said adapter comprising:

a housing;
means for detachably mounting said housing to the side of the female fitting adjacent said side opening so that the adapter can be readily removed fom the fitting;
said housing having a cylinder;
a piston slidably mounted in the cylinder in a direction normal to said rotatable shaft;
fluid power source means in said cylinder for driving the piston;
rotatable driving means mounted in said housing for interconnecting said rotatable shaft with said piston;
said driving means being readily separable in an axial direction when the housing is detached;
said adapter having means for securing the rotatable shaft in a released position preventing reuse of the connector;
whereby activation of the power source will cause the piston through said rotatable means to rotate the shaft and release said fittings.

2. The power adapter of claim 1 wherein said fluid source is self-contained, and said securing means prevents the connector to be reusable until the spent adapter is replaced with a new power source.

3. The power adapter of claim 2 wherein the end of an extension of the rotatable shaft and said rotatable driving means have interconnecting complementary lug and recess surfaces to enable an expended power adapter to be readily replaced from a position laterally the connector.

4. The power adapter of claim 3 wherein said lug is mounted on the end of the extension of said rotatable shaft, and said recess is formed on the rotatable means.

5. The power adapter of claim 1 wherein said rotatable means is a disk-shaped member having an offset cam surface formed in an end face thereof engageable by the piston.

6. The power adapter of claim 5 wherein said cam surface leads to a socket, and said piston has an extending rod capable of being seated in said socket.

7. The power adapter of claim 1 wherein said housing has an opening co-extensive with said side opening in the female fitting when attached thereto, and extending transverse to the cylinder;

said rotatable means being a disk-shaped anvil member rotatably mounted in said housing opening;

said disk having an off-set cam surface;

said piston having a rod extension aligned with the cam surface for rotating the disk;

said disk having a socket adjacent said cam surface to receive the piston extension for securing the parts together in a locked condition after the disk has been rotated;

the rotatable shaft end and disk having interconnectible lug and recess surfaces.

8. A quick-release connector comprising:

a male connector half fitting having at least one longitudinally extending prong having a recess at its free end;

a female connector half fitting having at least one longitudinal opening to receive said prong;

a shaft rotatably mounted transversely in said female fitting and engageable with the recess in said prong for releasably locking together said connector fittings;

said female fitting having a side opening through which an end of said rotatable shaft is accessible;

manual lever means for actuating the rotatable shaft to disengage said prong to permit the fittings to be separated;

said connector having a housing on one side of the female fitting provided with a transverse opening adjacent to and aligned with said side opening in the female fitting;

said housing having a cylinder;

a piston slidably mounted in the cylinder in a direction normal to said side opening;

a fluid power source for driving the piston;

a driving member rotatably mounted in said housing adjacent to said side opening and connected to the end of said rotatable shaft;

said driving member being aligned with the piston and engageable thereby for rotation;

whereby activation of the power source will cause the piston through said driving member to rotate the shaft and unlock said fittings;

said driving member having means for securing the rotatable shaft and the connector in the unlocked position.

* * * * *